United States Patent
Rigney et al.

(12) 
(10) Patent No.: US 6,444,060 B1
(45) Date of Patent: Sep. 3, 2002

(54) ENHANCEMENT OF AN UNUSED PROTECTIVE COATING

(75) Inventors: Joseph D. Rigney, Milford; Jeffrey A. Conner, Hamilton, both of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/469,469

(22) Filed: Dec. 22, 1999

(51) Int. Cl.⁷ ............................................. B32B 15/01
(52) U.S. Cl. ...................... 148/535; 148/518; 148/531
(58) Field of Search ...................... 198/518, 527, 198/530, 531, 535

(56) References Cited

U.S. PATENT DOCUMENTS

| | | | |
|---|---|---|---|
| 3,999,956 A | 12/1976 | Stueber et al. | 29/194 |
| 4,123,594 A | 10/1978 | Chang | 428/651 |
| 4,501,776 A | 2/1985 | Shankar | 427/253 |
| 5,658,614 A | 8/1997 | Basta et al. | 427/253 |
| 5,788,823 A * | 8/1998 | Warnes et al. | 148/518 |
| 5,897,966 A | 4/1999 | Grosskalus, Jr. et al. | 428/652 |
| 5,942,337 A * | 8/1999 | Rickerby et al. | 148/518 |
| 5,972,424 A | 10/1999 | Draghi et al. | 427/142 |

OTHER PUBLICATIONS

*ASM Handbook*, vol. 5, Surface Engineering, pp. 55–60, 110–117, 611–620, and 784–794, ASM International, 1994.*

* cited by examiner

*Primary Examiner*—George Wyszomierski
(74) *Attorney, Agent, or Firm*—David L. Narciso; Lee H. Sachs

(57) ABSTRACT

A method is provided for enhancing to a selected coating range a substantially unused protective coating, including aluminum, on an article surface, for example an airfoil surface of a gas turbine engine turbine blade. The protective coating is enhanced without removing such unused coating. The unused coating is evaluated to identify at least one coating region that deviates from the selected coating range by being deficient in at least one of chemistry and physical condition, for example thickness. At least the coating region is enhanced to the selected coating range by applying over the identified coating region at least one secondary element selected from Pt, Rh, Pd, Cr, Si, Hf, Zr, and Y. At least the coating region is heated to diffuse the secondary element into the protective coating to provide a treated coating region. Then at least the treated coating region is aluminided.

9 Claims, No Drawings

ENHANCEMENT OF AN UNUSED PROTECTIVE COATING

BACKGROUND OF THE INVENTION

This invention relates to substantially unused environmental protective coatings; and, more particularly, to such coatings that include at least one region deviating from a selected specified range.

Components operating in the gas path environment of a power generating apparatus, for example a gas turbine engine, are subject to significant temperature extremes and degradation by an oxidizing and corrosive environment. It has been a practice in that art to apply at least one of oxidation resistant, corrosion resistant, and thermal barrier coatings to exposed surfaces of such components to protect them from the operating environment. At the same time, the protective coating affords the opportunity to improve engine efficiency by increasing operating conditions. Typical coatings include aluminum diffused into a component surface or an underlying layer of a protective or bond coat for example of the well known MCrAl type, with or without an outer coating of a ceramic type thermal barrier coating. In the MCrAl type coating, the "M" represents at least one of Fe, Ni, and Co, and the alloy can include other elements such as Y. These coatings are well known, and have been widely used and described in connection with gas turbine engines.

It is intended that coated components be manufactured in selected, specified ranges including ranges and levels for coating chemistry and coating physical condition, for example coating thickness. At times, processing difficulties encountered in isolated steps in the manufacturing process have resulted in a coating that, in at least one identified coating region, is too thin and/or has an incorrect chemistry. Correction of such a defect in a coating, frequently having a portion that has been diffused into a component surface, includes removing the defective coating and reapplying an acceptable coating, or scrapping the component. Both of such actions are costly in effort, time delays, etc. In addition, removal and reapplication of coatings can thin a component wall, for example an airfoil wall, to near or below specified minimums. This either requires scrapping of the component or it limits future repairability.

In another situation, a manufacturing specification has been changed after component manufacture or otherwise it is desired to upgrade the coating on an existing, unused component. For example, this can occur when it is desired to upgrade a relatively simple diffused aluminide coating to one including a performance enhancing secondary element such as at least one of Pt, Rh, Pd, Cr, Si, Hf, Zr, and Y, used for such purposes in coatings in the turbine engine art.

Provision of a method for enhancing a substantially unused, existing protective coating without requiring removal of the coating can be beneficial for a variety of reasons including reduced cost of component manufacture and time delays.

BRIEF SUMMARY OF THE INVENTION

The present invention, in one form, provides a method for enhancing on an article a substantially unused protective coating, including aluminum, to a selected coating range. The method comprises first evaluating the unused coating to identify at least one substantially unused coating region that deviates from the selected range by being deficient in at least one of chemistry and physical condition. The coating region is enhanced to the selected coating range by applying over the unused coating at least to the coating region at least one secondary coating element selected from Pt, Rh, Pd, Cr, Si, Hf, Zr, and Y. Then at least the secondary element is heated to diffuse the element into the unused coating to provide a treated coating region.

DETAILED DESCRIPTION OF THE INVENTION

Environmentally protected gas turbine engine components include turbine section blading members such as turbine rotating blades and stationary vanes exposed during engine operation to strenuous high temperature conditions including oxygen from air along with products of fuel combustion. An example of one such gas turbine engine turbine blade is shown in U.S. Pat. No. 5,458,461—Lee et al. (patented Oct. 17, 1995).

It has been a practice to apply at least to an outer surface of the airfoil of such a blading member a diffused aluminide type of coating or an overlay MCrAlY type of coating, alone or in combination, for example as a bond coat, with an outer ceramic type thermal barrier coating. Diffused aluminide coatings have been applied commercially by a variety of reported methods including pack cementation, above the pack, vapor phase, chemical vapor deposition, and slurry coating processes. An example of one type of aluminide coating sometimes is called Codep aluminide coating, forms of which are more fully described in Levine et al. U.S. Pat. No. 3,540,878 (issued Nov. 17, 1970); U.S. Pat. No. 3,598,638 (patented Aug. 10, 1971) and U.S. Pat. No. 3,667,985 (patented Jun. 6, 1972). Other examples of high temperature coatings used for environmental resistance include a combination with aluminum of one or more of the above-identified secondary elements. For example, Pt from the platinum group of elements including Pt, Rh, and Pd has been used to provide a Pt—Al type of coating. Forms of this combination of coatings are described in U.S. Pat. No. 3,819,338—Bungardt et al. (patented Jun. 25, 1974). Generally the Pt—Al type of coating is applied by first electrodepositing or sputtering Pt on a surface and then diffusion aluminiding of the surface, diffusing both the Pt and the Al.

In the design of such gas turbine engine components, coating properties, including coating composition and coating thickness, are specified in selected ranges depending on the temperature and the environmental conditions the component is intended to experience. Then coating application conditions and materials have been selected to provide such properties in the selected ranges. For example, the thickness and aluminum content of an aluminide coating has been controlled by varying the coating time, coating temperature, and/or aluminum activity of material used in the coating process. Similarly, the amount of a secondary element in the coating, for example Pt, has been controlled by varying the thickness of the element deposited on a surface prior to diffusion aluminiding.

It has been observed that processing difficulties, for example in Pt electroplating and/or aluminiding, have been encountered in isolated steps in a coating process. Evaluation of newly applied, substantially unused coatings have identified regions of a coating that deviate from a selected specified range, for example for physical condition and/or chemistry. Coatings have been observed as too thin, or with incorrect Al or Pt content, or their combinations.

Components with insufficient Al frequently have been reprocessed through an aluminiding cycle similar to one previously used, increasing the Al level to within the specified range. Such reprocessing does not require removal of the existing coating and its diffusion zone. However, if no secondary element is present or if the level of a secondary element such as Pt is too low, correction of the problem by adding a secondary element is significantly more difficult and costly. Either the existing coating, including its diffusion zone, has been stripped and a replacement coating reapplied, or the component has been scrapped. The cost of scrapping or limiting future repairability, as mentioned above, is undesirable; the effort and cost of reworking a component in this way generally is unacceptable in time delays as well as cost of manufacture. Forms of the present invention provide a method for enhancing an existing, substantially unused diffusion aluminide coating without removal of the existing coating.

In an evaluation of forms of the present invention, a new Pt—Al diffusion coating on an unused airfoil of a gas turbine engine turbine blade was evaluated for compliance with a specification. Identified was a region of the coating that deviated from a selected range in the specification: it was deficient in the required amount of the secondary element Pt. According to an embodiment of the present invention, without removing the existing unused coating, additional Pt was deposited over such coating on the identified region in an amount to enhance the Pt in the coating to within the specified range. In this example, the Pt was electrodeposited on the existing coating, although other means such as sputtering have been used. The Pt deposit, which was about 0.1 mil in thickness, was heated in the range of about 900–1150° C., for example about 1037° C., for a time in the range of about 0.5–4 hours, for example about 2 hours, to diffuse the Pt into the underlying coating, providing a treated coating region. This diffusion step for a secondary element such as Pt alone, eliminates the need for an extended high temperature exposure generally conducted during known aluminide cycles to accomplish both diffusion of such a secondary element as well as aluminiding. As a result, significantly more flexibility was allowed in the selection and type of a subsequent aluminiding process and its process parameters. In this evaluation, after heating and diffusing the deposited Pt, at least the treated coating region, and in this case the entire airfoil, then was aluminided using a vapor phase type of process. The aluminiding process and parameters were selected such that a desired Pt modified aluminide coating was produced in the identified region deficient in Pt while adjacent surfaces not treated with Pt were surface enriched with Al without appreciable change in thickness.

In another evaluation, it was desired to enhance an existing aluminide coating on an airfoil of a gas turbine engine turbine blade that had not been operated in an engine. Because the existing substantially new aluminide coating did not include the element Pt, it was desired to enhance such coating with Pt to be within a specification different from one used to manufacture the blade initially. The method conducted in the above described evaluation was repeated by first electrodepositing Pt on the aluminided airfoil surface, heating the deposit to diffuse the Pt into the underlying coating to provide a treated coating region, and then aluminiding the treated coating region to provide an enhanced Pt—Al coating over the airfoil surface.

In another form of the present invention, after applying and diffusing of the secondary element, the subsequent aluminiding step can include the addition of more of the same or a different of the secondary elements.

In the above evaluations, the secondary element Pt was applied to and diffused into the coating region including Al prior to subsequent aluminiding. That is a preferred method when the secondary element is a "noble" element such as Pt, Rh and/or Pd. However, generally others of the secondary elements can be applied before the aluminiding step and directly aluminided without first heating to diffuse. Also, the secondary element can be applied concurrently with an aluminiding step.

Forms of the present invention are a method for enhancing an unused coating on an article surface without removing the existing coating to provide an outer environmental resistant coating, a bond coat for subsequent thermal barrier coating application, etc., tailored to a desired specification. The present invention has been described in connection with specific embodiments, examples, methods, and materials. However, it should be understood that they are intended to be typical of, rather than in any way limiting on, the scope of the present invention. Those skilled in the art will understand that the invention is capable of variations and modifications without departing from the scope of the appended claims.

What is claimed is:

1. A method for enhancing an existing substantially unused high temperature environmentally resistant metallic diffused aluminide protective coating on an article surface, the existing coating being within a first selected coating range, comprising the steps of:

specifying a second selected coating range for the unused diffused aluminide protective coating, the second selected coating range being different from the first selected coating range in at least one of chemistry and physical condition;

evaluating the existing unused metallic diffused aluminide protective coating to identify at least one substantially unused coating region that deviates from the second selected coating range by being deficient in at least one of chemistry and physical condition and the amount of being deficient; and then, without removing the existing unused metallic diffused aluminide protective coating, enhancing at least the coating region of the substantially unused diffused aluminide protective coating to the second selected coating range by steps including:

a) applying over the unused metallic diffused aluminide protective coating at least to the unused coating region at least one secondary element selected from the group consisting of Pt, Rh, Pd, Cr, Si, Hf, Zr, and Y; and, b) heating at least the coating region to a temperature and for a time sufficient to diffuse the secondary element into the diffused aluminide protective coating to provide a treated coating region.

2. The method of claim 1 in which aluminiding of at least the treated coating region is conducted after heating of at least the coating region to diffuse the secondary element.

3. The method of claim 1 in which aluminiding of at least the treated coating region is conducted concurrently with applying the at least one secondary element.

4. The method of claim 1 in which aluminiding of at least the coating region is conducted concurrently with heating of at least the coating region with the secondary element.

5. The method of claim 1 in which aluminiding of at least the coating region is conducted concurrently with enhancing at least of the coating region.

6. The method of claim 1 in which:

the secondary element is Pt; and, the heating is conducted at a temperature in the range of about 900–1150° C. for a time in the range of about 0.5–4 hours.

7. The method of claim 1 for enhancing on a gas turbine engine article surface a substantially unused protective aluminide coating to a selected coating range in which at least the coating region is enhanced to the selected coating range by:

selecting at least one element of Pt, Rh, and Pd from the group of secondary elements and applying the element over the aluminide coating at least to the unused coating region;

heating at least the coating region to a temperature in the range of about 900–1150° C. for a time in the range of about 0.5–4 hours to provide the treated coating region; and then, aluminiding at least the treated coating region.

8. The method of claim 7 in which:

the article surface is a surface of an airfoil; and, the secondary element selected is Pt.

9. The method of claim 8 in which the article surface is the entire surface of the airfoil.

* * * * *